June 25, 1929. R. I. SCHONITZER. Re. 17,343

APPARATUS FOR MAKING METAL WOOL AND SHAVINGS.

Original Filed April 16, 1919

5 SHEETS—SHEET 1.

Inventor:
R. I. Schonitzer,
by Sutard & Sutard,
his Att'ys.

June 25, 1929. R. I. SCHONITZER. Re. 17,343

APPARATUS FOR MAKING METAL WOOL AND SHAVINGS.

Original Filed April 16, 1919

5 SHEETS—SHEET 2.

Inventor:
R. I. Schonitzer,
by Shepard & Shepard
his Att'ys.

June 25, 1929. R. I. SCHONITZER. Re. 17,343

APPARATUS FOR MAKING METAL WOOL AND SHAVINGS.

Original Filed April 16, 1919

5 SHEETS—SHEET 3.

Inventor:
R. I. Schonitzer,
by Shepard & Shepard
his Att'ys.

June 25, 1929. R. I. SCHONITZER. Re. 17,343

APPARATUS FOR MAKING METAL WOOL AND SHAVINGS.

Original Filed April 16, 1919

5 SHEETS—SHEET 4.

Inventor:
R. I. Schonitzer,
by Shepard & Shepard
his Att'ys.

June 25, 1929. R. I. SCHONITZER. Re. 17,343

APPARATUS FOR MAKING METAL WOOL AND SHAVINGS.

Original Filed April 16, 1919

5 SHEETS—SHEET 5.

Inventor:
R. I. Schonitzer,
by Shepard & Shepard
his Att'ys.

Reissued June 25, 1929. Re. 17,343

UNITED STATES PATENT OFFICE.

RUDOLPH I. SCHONITZER, OF MAUMEE, OHIO, ASSIGNOR, BY MESNE ASSIGNMENTS, TO THE STEEL WOOL PRODUCTS CORPORATION, OF PERRYBURG, OHIO, A CORPORATION OF OHIO.

APPARATUS FOR MAKING METAL WOOL AND SHAVINGS.

Original No. 1,419,472, dated June 13, 1922, Serial No. 290,499, filed April 16, 1919. Application for reissue filed February 14, 1929. Serial No. 339,966.

This invention relates to the production of the so-called metal wool or steel wool and shavings, and has for its object to provide certain new and useful improvements, as will be hereinafter more fully described, shown in the accompanying drawings, and particularly pointed out in the appended claims, it of course being understood that changes in the form, proportion, size and minor details may be made, within the scope of the claims, without departing from the spirit or sacrificing any of the advantages of the invention.

Figure 1:
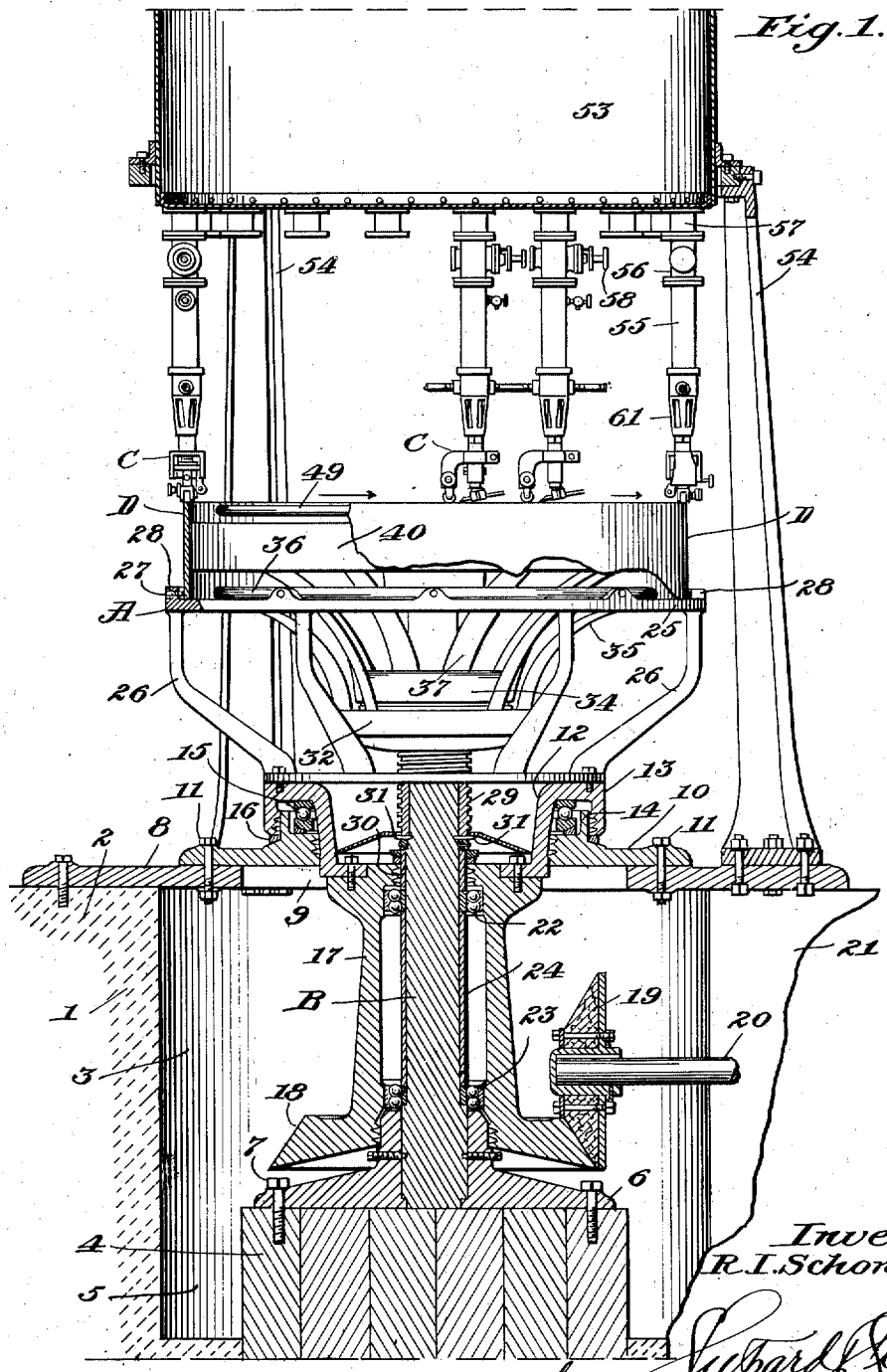
Figure 1 is a central vertical sectional view of a metal wool machine embodying the features of the present invention, the work carrying chuck being shown in elevation.
Figure 2:
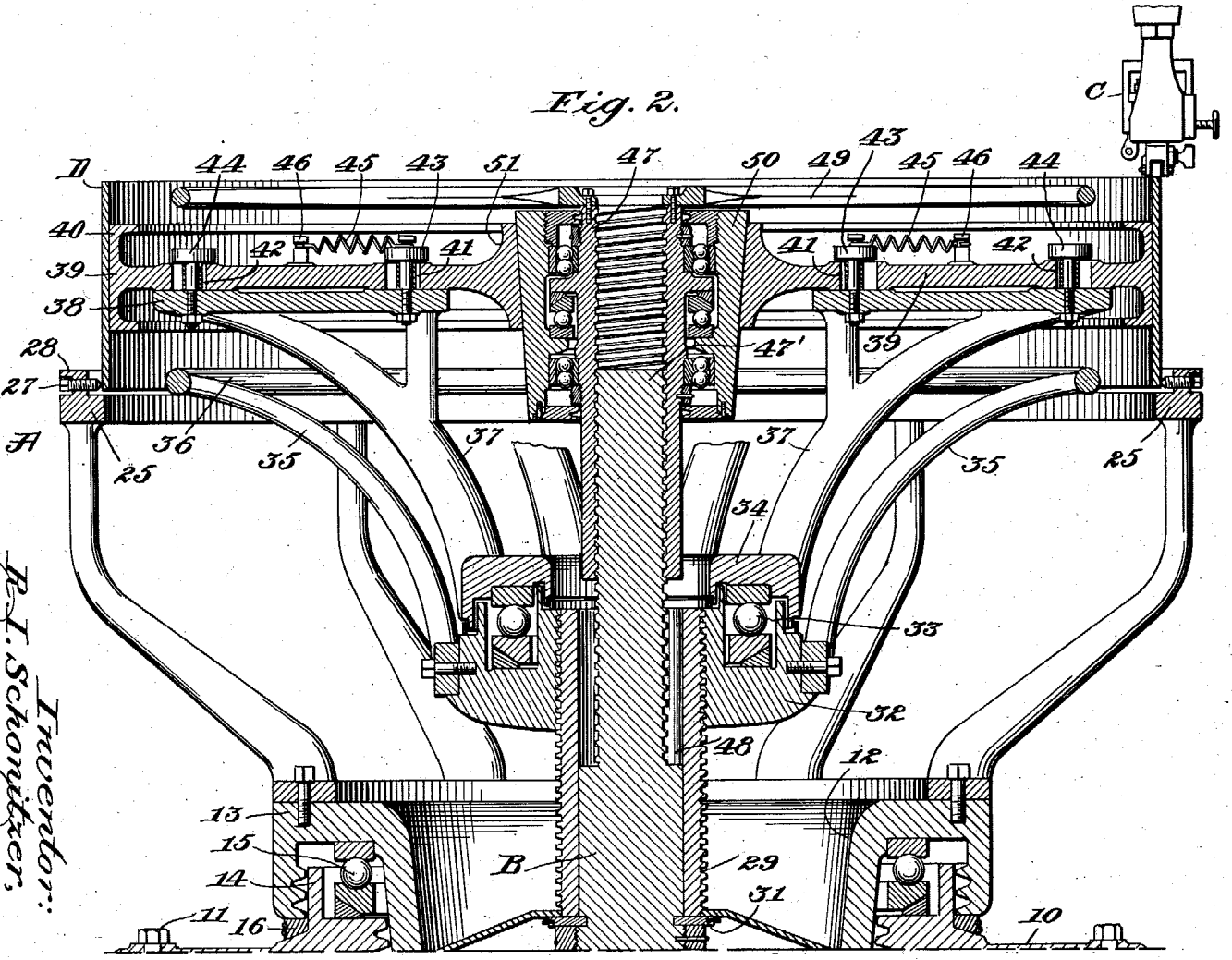
Figure 2 is a vertical central sectional view of the work driver and work holding chuck on an enlarged scale.
Figure 3:
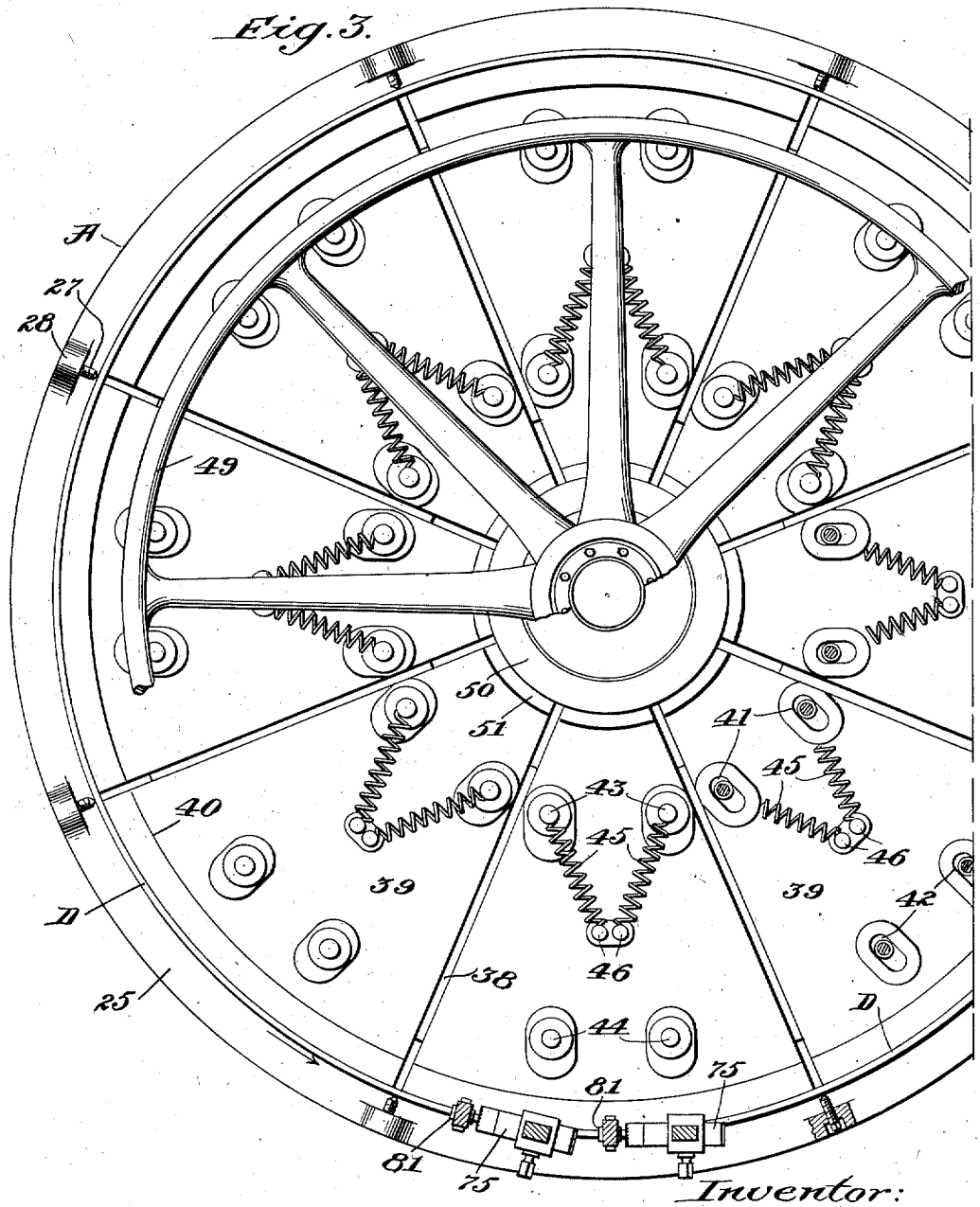
Figure 3 is a top plan view of Figure 2, the adjusting hand wheel being broken away.

The embodiment of my invention shown in the accompanying drawings includes a work holder and driver A rotating in a substantially horizontal plane, mounted upon a support B, preferably in the form of an upright standard, and a tool holder and cutter C mounted above the work-holder and designed to carry a cutting tool held in cooperative relation with a work-piece D in the form of a cylinder. As illustrated, the tool holder supports the tool in cooperative relation with the upper edge of the cylindrical work-piece, the tool being stationary and the work piece being rotated, whereby strands or shavings are cut from the upper edge of the work-piece. It will here be explained that the cutting operation is continuous, in the sense that the work-piece is rotated continuously in the same direction and the cutting tool is automatically fed towards the work-piece so as to always remain in cutting relation thereto as the length or height of the work-piece diminishes under the cutting or shaving action of the cutter. It will of course be understood that a plurality of cutter holders and feeders are employed, and arranged in a circular series. Each holder and feeder is entirely independent of each of the other holders and feeders, as will be hereinafter more fully described.

For the support of the apparatus, I preferably construct a masonry foundation 1, the top of which is at the floor level 2. Within the foundation is a pit 3, and within the bottom of the pit is embedded a base member 4, preferably of wood. The diameter of the base member 4 is less than the diameter of the pit so as to leave an annular space 5 for a purpose as will be hereafter described.

Rising centrally from the top of the base 4 is the standard B, the bottom of which is rigidly secured within a base flange 6 suitably secured to the top of the base 4, as by fastenings 7. It will be noted that the support or standard B rises a suitable distance above the open top of the pit. Surrounding and overhanging the open top of the pit is a base plate 8 provided with a concentric opening 9 of a diameter large enough to permit of the downward introduction therethrough of the base flange 6. Upon the top of the base plate 8 is a supporting ring 10 secured thereto by suitable fastenings 11. Within the ring 10 is a rotating hanger 12 of substantially cylindrical shape, provided at its upper edge with an external depending cylindrical flange 13 constituting the upper member of a bearing, the lower member 14 of which is provided upon the ring 10. Suitable anti-friction devices 15 are provided between the bearing members 13 and 14, thereby constituting a thrust-bearing. If desired, a dust-excluding packing 16 may be provided between the bearing members 13 and 14. Hung from the hanger 12 is a cylindrical hub 17 concentric with the standard B and provided at its lower end with a driving wheel 18 to which power may be applied in any suitable manner. As shown in the drawings, the driving wheel 18 is of conical form and power is applied thereto by another conical wheel 19 mounted upon a shaft 20, extending transversely outward through a tunnel or opening 21 formed through the foundation 1. This tunnel also serves as a means of access to the pit 3 for purposes of mounting the apparatus and for purposes of general inspection and repairs. While toothed gearing may be employed, a friction drive is preferred, as shown in the drawing. Top and bottom anti-friction annular bearings 22 and 23 are employed between the hub 17 and the standard B, a suitable spacing sleeve 24 being employed to maintain the bearings 22 and 23 spaced at the desired distance. The hub 17 and the driving wheel 18 are of relatively massive construction in order to operate as a counter-balance for the heavy construction which rotates about the upper portion of the post or standard B.

Disposed above the hanger 12 is a ring 25 supported by a plurality of upstanding arms 26 rising from the hanger 12. At suitable intervals around the ring 25 there are set screws 27 which pierce upstanding projections 28 on the ring, and are designed to engage the exterior of the work-piece D. The set screws 27 are not intended as the sole support of the weight of the work-piece D, as the latter is otherwise supported, as will be hereinafter explained. The main purpose of the set screws 27 is to afford a driving connection between the work-piece D and the driving ring or member 25, whereby the work-piece is rotated concentrically about the post or standard B.

At a suitable distance above the sleeve 24 there is an externally screw-threaded sleeve 29, and between the bearing 22 and the threaded sleeve 29 is a spacing sleeve 30. The sleeve 29 is fixed against rotation upon the post or standard B by means of suitable pins or keys 31 extending through notches in the bottom of the sleeve 29 and entering openings in the post or standard B. A nut 32 is mounted upon the threaded portion of the sleeve 29, and is provided on its upper face with an annular raceway containing anti-friction devices 33. A suitable bearing member 34, in the form of a ring, is supported upon the anti-friction devices 33 and is capable of rotating upon the nut 32. Upwardly extending and outwardly diverging arms 35 rise from the nut 32 and carry at their upper ends a hand wheel 36, for use in turning the nut 32, so as to work the latter up and down upon the post or standard B. Arms 37 extend upwardly and outwardly from the rotatable bearing member 34 and carry at their upper ends a ring 38. Supported upon the ring 38 is a series of segments 39, each of which is provided upon its outer convex end with an upright flange 40 extending above and below the segment. Each segment is provided with inner and outer slots 41 and 42 receiving headed studs 43 and 44 rising from the ring 38. The studs 43 and 44 guide the segment 39 during the adjustment thereof which is radial to the post or standard B, and the ends of the slots 41 and 42 limit the movement of the segment in opposite directions. A pair of helical springs 45 have their outer ends connected to a stud or post 46, rising from an intermediate portion of the segment 39, and their rear ends connected to the respective studs 43. Said springs are normally under tension with a tendency to move the segment inwardly towards the post or standard B, so that when outward pressure is removed from the segment it will be automatically drawn inwardly so as to relieve the pressure of its flange portion 40 from the inner wall of the work-piece D.

It will here be explained that the series of segments 39 constitute a centering device for centering the work-piece D within the driving element 25 and also to bring the work-piece to true cylindrical form. For the purpose of forcibly moving the series of segments 39 radially outward, there is provided a nut 47 mounted upon the threaded upper portion 47′ of the post or standard B. This threaded portion of the post is of reduced diameter and extends a suitable distance into the open upper end of the screw-threaded sleeve 29, whereby an annular space 48 is provided and into which the lower end portion of the nut 47 may descend when the latter is adjusted downwardly. On the top of the nut 47 is secured a hand wheel 49 for convenience in adjusting the nut. A wedge shaped or downwardly tapered sleeve 50 embraces and is carried by the upper portion of the nut 47, the outer or tapering face of the sleeve fitting within the hub portions 51 at the inner ends of the segments 39, the faces of which are inclined in accordance with the inclination of the exterior of the cone or wedge 50. The cone 50 is hung upon the upper end portion of the nut 47 in any suitable manner, for instance, as shown in the drawings. It will now be understood that the nut 47 may rotate within the cone or wedge 50, whereby the latter will be moved upwardly and downwardly without rotation. Downward movement of the wedge 50 will force the segments 39 radially outward into engagement with the inner periphery of the tubular work-piece D, while upward movement of the cone or wedge 50 will result in releasing the segments 30 so as to permit of the latter being drawn inwardly and out of engagement with the work-piece D by reason of the action of the springs 45.

As thus far described, it will be seen that the nut 32 which carries the internal chuck made up of the segments 39, is capable of being adjusted vertically by manipulation of the hand wheel 36, whereby the internal chuck may be lowered until the upper hand wheel 49 is below the top of the driving ring 25, whereupon the work-piece D may be placed sidewise within the ring 25 without interference by the internal chuck. Preparatory to placing the work-piece D within the driving element 25, pieces of wire, chips or the like, are placed upon the top of the member 25 so as to temporarily support the work-piece out of engagement with the top of the ring 25. After the work-piece has been thus put in place, the hand wheel 36 is manipulated to move the internal chuck upwardly and into the tubular work-piece D, whereupon the hand wheel 49 is manipulated to move the wedge 50 downwardly and expand the chuck until the work-piece D is snugly gripped and supported by the chuck and also brought into true circular form. When this is done the set screws 27 are set up tightly against the work-piece D and the pieces of wire, chips or the like are removed from beneath the work-piece D. By temporarily supporting the work-piece D above and out of contact with the driving ring 25, said work-piece D is relatively loose and in condition to conform itself to the circular shape of the internal chuck without interference on the part of the driving ring 25. The work-piece having thus been gripped by the chuck and connection made between the driving member 25 and the work-piece D by means of the set screws 27, the work-piece may be rotated by applying power to the driving wheel 18, as motion is translated therefrom through the hub 17, the hanger 12 and the arms 26.

As hereinbefore set forth, a series of cutter holders and feeders C are disposed above and in cooperative relation with the upper edge of the work-piece D. As these cutter holders and feeders are duplicates in construction, mounting and manner of operation, a detailed description of one of them is is deemed sufficient. Each cutter holder and feeder is disposed above the work-piece D, is capable of gravitating into cooperative relation therewith an is hung from the bottom of a suitable tank or reservoir 53, supported upon standards 54 rising from the base plate 8 to which said standards are bolted or otherwise secured. This tank or reservoir is designed to contain fluid under pressure which may be admitted to each cutter holder and feeder for the purpose and in the manner as will be hereinafter described.

Each cutter holder and feeder includes a cylinder 55 surmounted by a valve casing 56 which is hung from the bottom of the tank 53 by means of a short pipe section 57. The valve stem 58 of the valve 56 is accessible at the exterior of the casing 56 for convenience in opening and closing the valve thereof. Working within the cylinder 55 is a rod 59 provided upon its upper end with a suitable piston 60 working in the cylinder 55 and subject to pressure admitted into the upper end of the cylinder through the valve casing 56 and from the tank or reservoir 53. The rod 59 projects a suitable distance below the cylinder 55 and is guided in a tubular guide member 61 hung from the lower end of the cylinder 55. An inverted substantially U-shaped yoke 62 is hung from the lower end of the rod 59. which projects through the open bottom of the guide 61. The inner sides of the upright arms of the yoke 62 are provided with guideways 63 in which works a cross head 64 having depending arms 65 which also work in the guide ways 63 and project through the open bottoms thereof. Between the cross head 64 and the bottom of the rod 59 is an adjusting member 66 provided with a screw-threaded stem 67 extending into a screw-threaded socket in the bottom of the rod 59. A stud 68 depends centrally from the member 66 and is provided with a circular head 69 rotatably received within a flanged notch or seat 70 in the top of the cross head 64. By rotating the member 66, which is accessible at the opposite open sides of the yoke 62, the cross head 64 may be raised and lowered. Upstanding finger pins 71 may be provided upon the member 66 for convenience in manipulating the same. Carried by and extending between the arms 65 is a cross-bar 72 that is embraced by a clamp 73 having a cutter holder 74 at its lower end. The clamp 73 may be adjusted lengthwise of the cross-bar 72, and also rotatably adjusted thereon so as to bring the cutter holder into any desired position. The cutter 75 is held in a seat or guideway in the lower portion of the holder 74 and is adjustable endwise therethrough. A suitable clamping screw 76 is employed for holding the cutter when set to any adjusted position. The cutter 75 is a flat bar having a chisel edge 77 at its forward and lower end which is in cooperative relation with the upper edge of the work-piece D, which latter rotates beneath the cutter and the latter cuts a chip or strand therefrom.

Figure 4:
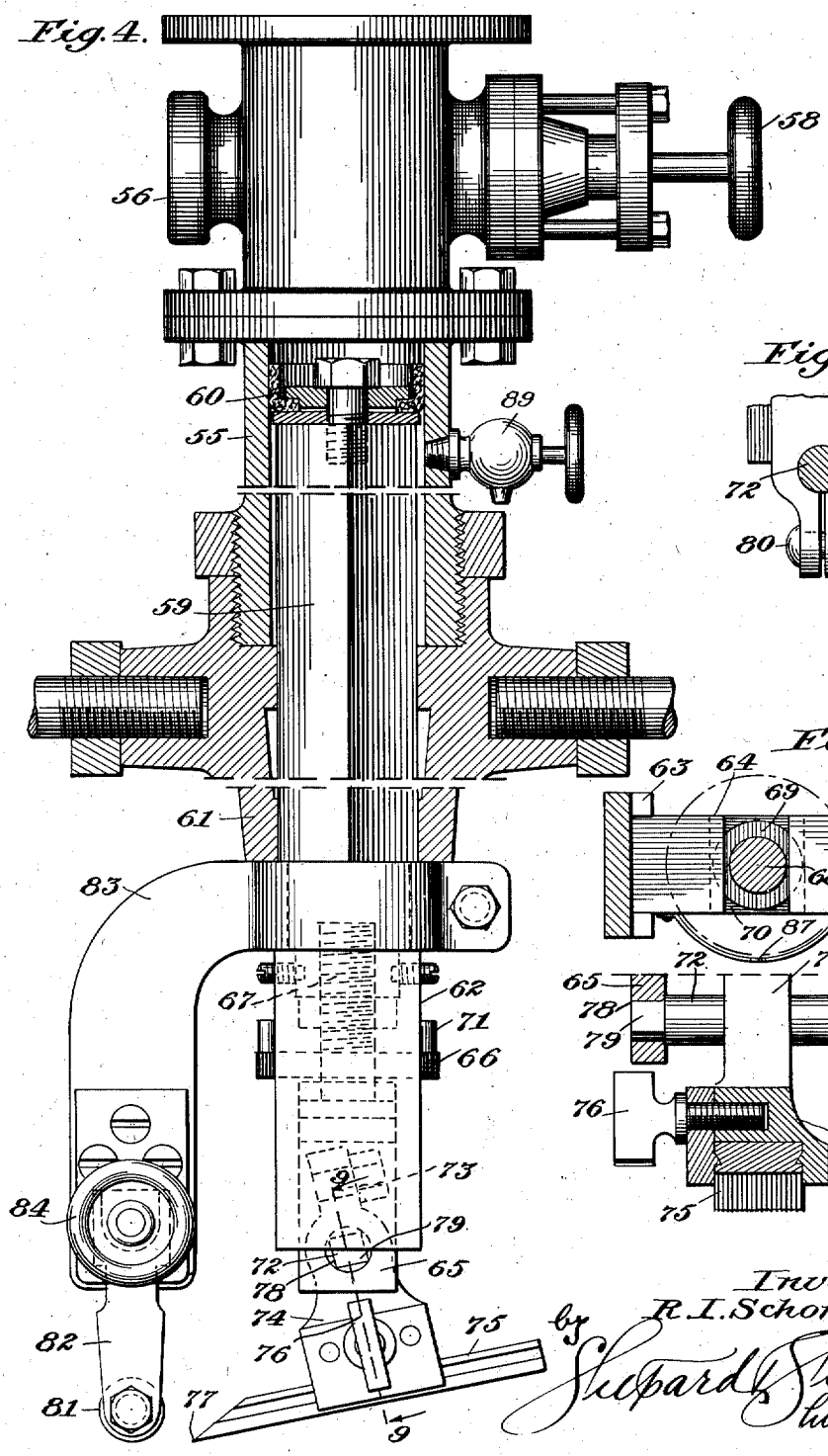
Figure 4 is a sectional elevation of one of the cutter holders and feeders on an enlarged scale.
Figure 7:
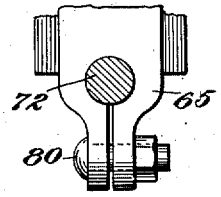
Figure 7 is a detail sectional view on line 7—7 of Figure 5.
Figure 8:
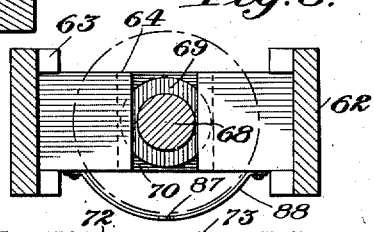
Figure 8 is a detail plan section on the line 8—8 of Figure 5.
Figure 9:
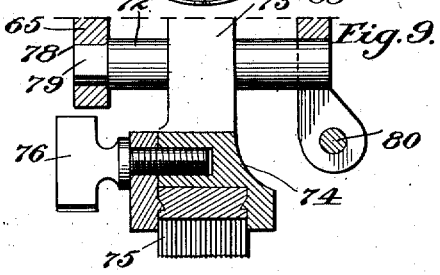
Figure 9 is a detail sectional view on the line 9—9 of Figure 4.
Figure 10:
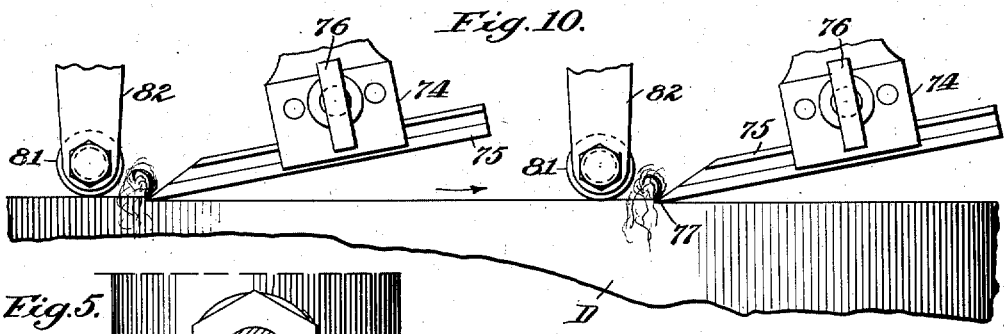
Figure 10 is a fragmentary elevation, on an enlarged scale, illustrating the operation of successive cutters.
Figure 5:
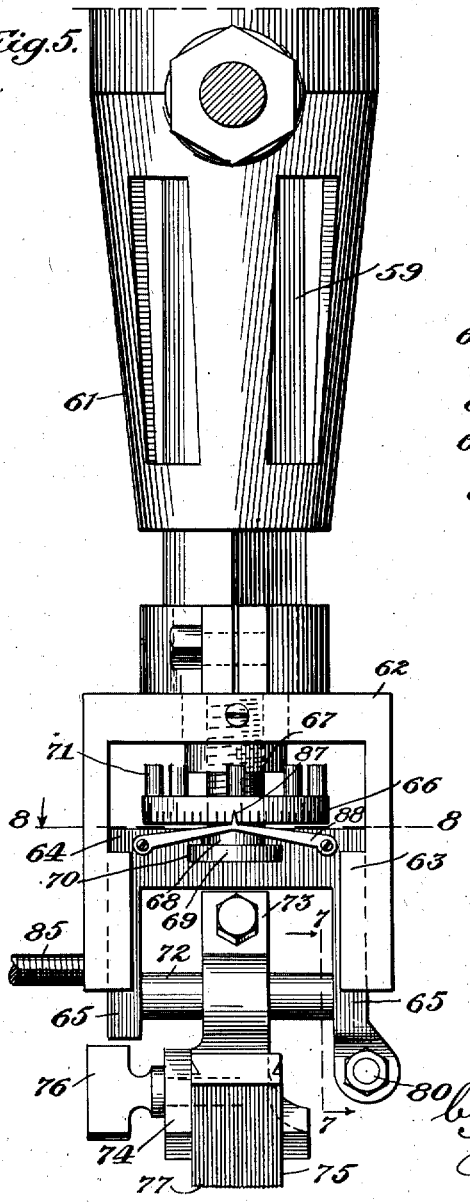
Figure 5 is the side elevation of the lower half of Figure 4, looking at the right hand side thereof.
Figure 6:
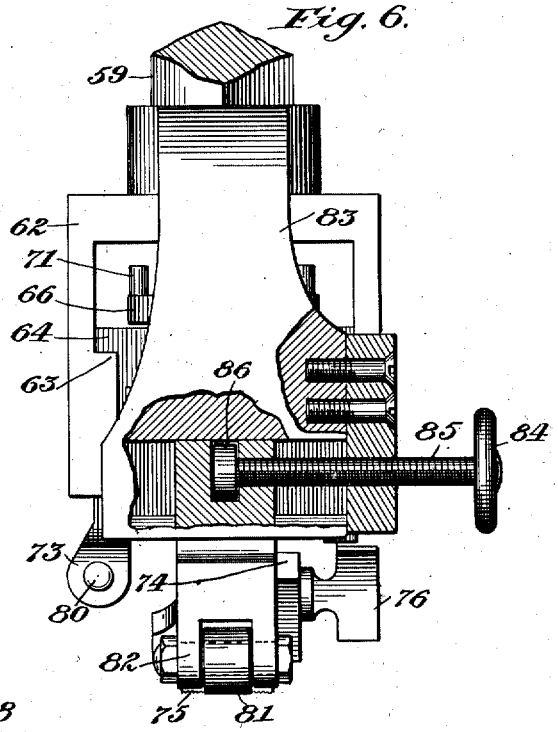
Figure 6 is a fragmentary elevation of the bottom portion of Figure 4, looking at the left hand side thereof, parts being broken away to show the adjustable mounting of the gage foot.

The cutter 75 preferably comprises a cutter having a serrated or grooved lower face as shown in Figs. 5 and 9 and having its upper surface beveled to an acute angle as shown in Figs. 4 and 10, thereby forming a chisel edge 77 which is serrated as shown in Figs. 5 and 6.

For convenience in mounting the cutter holder 74 from the cross-bar 72, the arm 65 is bifurcated in order that the bar 72 may be placed endwise through the bifurcation and into engagement with the opposite arm 65, the latter being provided with a non-circular seat or socket 78 to receive the similarly shaped end portion 79 of the bar 72, whereby the latter is held against rotation. A clamping screw 80 is employed to draw together the sides of the bifurcated arm 65 so as to clamp the same upon the bar 72 and hold it firmly in place.

Disposed in front of the cutter 75 there is a gage member which preferably includes a roller 81 to travel upon the top edge of the work-piece D, and carried in a forked arm 82 depending from the lower end of a substantially L-shaped bracket 83, secured to the rod 59 at a point between the bottom of the guide 61 and the yoke 62. The foot or roller 81 is adjustable transversely of the cutter by means of a hand wheel 84 on a screw-threaded stem 85 having a swiveled connection 86 with the upper portion of the arm 82, which is mounted to slide in a guide-way in the lower end of the bracket 83. It will here be explained that the bracket 83 and foot 81 are fixed upon the rod 59 against movement longitudinally on said rod, while the cutter holder 74 is adjustable vertically for the purpose of obtaining any desired depth of cut, in order to produce the different desired gages of steel wool. In order that any predetermined depth of cut may be obtained in accordance with the desired gage of steel wool to be produced, the body of the adjusting member 66 is circular in form and provided on its peripheral edge with a scale, as best shown in Figure 5 of the drawings, and in cooperative relation with the scale is a pointer or index 87 carried by a bracket 88 secured to the cross head 64.

In the operation of the machine or apparatus, the hand wheel 36 is manipulated to feed the nut or member 32 downwardly until the hand wheel 49 is below the top of the driving member 25, whereupon the tubular work piece D may be introduced sidewise between the driving member 25 and the series of shaving cutters, and into operative position. The hand wheel 36 is then manipulated to feed the nut 32 upwardly and thereby bring the internal chuck upwardly and into the tubular work piece at any desired position therein. The hand wheel 49 is then manipulated to screw downwardly the nut 47 and thereby force outwardly the chuck members 39 into engagement with the interior walls of the work piece, whereby the latter will be brought to true circular form and also held rigidly upon the chuck. The set screws 27 are then set up tightly against the work piece. Prior to fitting the work piece in place, the cutter holders are forced upwardly out of the way. In order that the cutter holders may be forced upwardly, a relief valve 89 is provided in the upper portion of each cylinder 55 so that by opening the valve, a communication is established between the interior of the upper portion of the cylinder 55 and the atmosphere so as to permit of the escape of air from the cylinder 55 when the cutter is pushed upwardly. After having thus been pushed upwardly to its upper limit, the cutter will remain in its elevated position until again brought down by hand into engagement with the upper edge of the work piece. Before bringing the shaving cutter into engagement with the work piece, it is adjusted vertically by manipulation of the member 66 until the cutter has been brought to the proper position, with respect to the gage 81, to give the desired depth of cut. After this adjustment has been made and the cutter brought down into operative relation to the work piece, fluid pressure is admitted into the upper end of the cylinder so as to place the desired pressure upon the shaving cutter 75, whereby the cutter is forced down into the work piece as far as will be permitted by the gage 81 when it comes into contact with the upper edge of the work piece. The gage 81 travels upon the top edge of the work piece and thereby limits and accurately gages the depth of the cut of the shaving cutter 75 in a very simple and efficient manner. When the several cutters have been adjusted and brought into operative position with respect to the work piece D, power is applied to the driving wheel 18, whereby the work piece D will be rotated and shavings will be cut from the top edge of the rotating work in the manner as clearly shown in Figure 10 of the drawings. It will here be explained that the successive shaving cutters are set or adjusted in progressive relation which relation is maintained by reason of the pressure upon the cutters and the fact that the gage members 81 are in engagement with the top edge of the work piece. The rotation of the work piece is continued until the work piece has been reduced to the point where the cutters are adjacent the top of the flange 40 of the internal chuck, whereupon the driving operation is stopped, the internal chuck is released from the work piece by manipulation of the hand wheel 49, and then the hand wheel 36 is manipulated to feed the internal chuck downwardly to a lower position within the tubular work piece, and then the hand wheel 49 is manipulated in the opposite direction to set the chuck members 39 tightly against the work piece. After this adjustment of the internal chuck, operation of the machine is resumed until the work piece has been reduced as far as it is desired to go.

It will here be explained that I employ a truly circular single thickness tubular work piece as distinguished from a tubular work piece wound in spiral laminations. One of the important advantages of a truly cylindrical tubular work piece is that the cutting edge of the shaving cutter is maintained in the most effective cutting relation to the work without requiring any automatic adjusting or shifting of the cutter during the operation of the machine.

It will further be explained that each cutter rod 59 is slidable in and guided by the guide member 61, and is capable of gravitating so as to bring the cutter 75 into cutting relation with the top edge of the work-piece D. For some grades of metal wool and shavings, the weight of the cutter bar 59 and associated parts is alone sufficient to maintain the cutter in cutting relation with the work-piece. For other grades of wool and shavings and under certain conditions, additional pressure may be applied to the cutter through the cutter bar 59, as for instance by applying fluid pressure to the upper end of the cutter bar 59 in the manner hereinbefore described.

While the fluid pressure is employed to maintain a downward pressure upon the shaving cutters, said fluid pressure will also permit yielding of the cutter to any uneven places in the upper edge of the work piece, and it will also permit the cutters to yield and accommodate themselves to any wobbling motion of the work piece which must of necessity occur, as it is impossible to produce and maintain an accurate rotation of the work piece. Moreover the use of fluid pressure for maintaining the work and cutters in cooperative relation is of course not limited to any particular shape of work piece.

What I claim is:

1. An apparatus for making metal wool and shavings, including a work holder, a plurality of cutters in cooperative relation with the work holder, means for individually gaging the depths of the cuts of the cutters, and means for automatically and individually maintaining the cutters and work holder in their original cooperative cutting relations throughout the cutting operation.

2. An apparatus for making metal wool and shavings including a work holder, a plurality of cutters disposed above and in cooperative relation with the work holder, and means for individually gaging the depth of the cut of each cutter, each cutter capable of gravitating towards the work holder independently of the other cutters for automatically maintaining each cutter in its original cooperative cutting relation with the work holder.

3. An apparatus for making metal wool and shavings including a work holder, a plurality of cutters in cooperative relation with the work holder, means for individually gaging the depths of the cuts of the cutters, and means for feeding the cutters towards the work holder with an elastically yieldable feed.

4. An apparatus for making metal wool and shavings including a work holder, a plurality of serrated and beveled cutters in cooperative relation with the work holder, means for individually gaging the depth of the cut of each cutter, and means for independently feeding each cutter with an elastically yieldable feed.

5. An apparatus of the class described, including a work-holder, a plurality of shaving cutters, means for effecting relative movement between the work-holder and cutters to cut shavings from a work-piece and fluid pressure means operating upon the cutters to maintain them in an elastically yieldable cutting relation with respect to the work-holder, each cutter having an individual valved connection with the source of fluid pressure.

6. An apparatus of the class described, including a work-holder, a plurality of shaving cutters including cylinders and pistons, means for effecting relative movement between the work-holder and cutters to cut shavings from a work-piece, and a source of fluid pressure, the cylinders having individual valved connections with the source of fluid pressure.

7. An apparatus of the class described, including a work-holder, means for rotating the work-holder upon an upright axis, a circular series of shaving cutters disposed above the work-holder and capable of gravitating into cutting relation with the work-holder.

8. An apparatus of the class described, including a work-holder, a cutter having a serrated and beveled cutting edge disposed above the work-holder and capable of gravitating into cutting relation therewith, and means to effect relative movement between the cutter and the work-holder to cut shavings from a work-piece.

9. An apparatus of the class described, including a work-holder, means for rotating the work-holder on an upright axis, a fluid pressure reservoir disposed above the work-holder, and a circular series of cutters disposed above the work-holder, each cutter being in communication with the fluid-pressure reservoir and capable of gravitating into cooperative relation with the work-holder.

10. An apparatus of the class described, including a work-holder, means for rotating the work-holder on an upright axis, a circular series of cutters disposed above the work-holder and capable of individually gravitating into cooperative relation with the work, a fluid pressure reservoir, and individual valved connections between the reservoir and the cutters.

11. An apparatus of the class described, including a rotary work-holder provided with means for bringing a tubular work-piece into true cylindrical form, and a shaving cutter disposed in position to have cutting engagement with one end of a tubular work-piece held by the work holder.

12. An apparatus of the class described, including a work-holder provided with means for bringing a tubular work-piece into true cylindrical form, a shaving cutter in cooperative relation with the work-holder, and means for effecting relative movement between the work-holder and the cutter for cutting shavings from a work-piece held by the work-holder.

13. An apparatus of the class described, including a work-holder provided with an internal chuck capable of expansion in true circular form to bring a tubular work-piece into true cylindrical form, a shaving cutter in cooperative relation with the work-holder, and means for effecting relative movement between the cutter and work-holder to cut shavings from a work-piece held by the work-holder.

14. An apparatus of the class described, including a work-holder having an internal chuck, a rotary driving member concentric with the chuck and provided with means for engaging a work-piece held by the chuck for driving the work-piece and chuck, and a cutter in cooperative relation with the work-holder.

15. An apparatus of the class described, including a work-holder having an internal chuck, a rotary driving member concentric with the chuck and provided with set screws for engaging a work-piece held by the chuck for driving the work-piece and chuck, and a cutter in cooperative relation with the work-holder.

16. An apparatus of the class described, provided with a work-holder having an internal chuck including radially adjustable segments and a wedge cooperating with the inner ends of the segments, a rotary driving member concentric with the chuck and provided with means for engagement with a work-piece held by the chuck, and a shaving cutter in cooperative relation with the chuck.

17. An apparatus of the class described, including a rotary work-holder, a rotary work-driving member, and a shaving cutter, and means for effecting adjustment of the work-holder with respect to the work-driving member to accommodate the work-holding member to the work-piece as its length diminishes under the action of the cutter.

18. An apparatus of the class described, including a rotary work-holder for engagement with one side of a work-piece, a rotary driving member for engagement with the opposite side of the work-piece, means for effecting adjustment of one of said members to accommodate said member to the work-piece as the length of the work-piece diminishes under the action of a cutter, and a cutter in cooperative relation with the work-holder.

19. An apparatus of the class described, including a rotary internal work-holding chuck, a rotary work-driving member concentric with the chuck, a cutter in cooperative relation with the work-holding chuck, and means to effect adjustment of the chuck along its axis of rotation to accommodate the chuck to the diminishing length of the work-piece under the action of the cutter.

20. An apparatus of the class described, including a support having a threaded portion, a nut adjustable upon the threaded portion of the support, a rotary work-holder mounted upon and adjustable with the nut, a shaving cutter in cooperative relation with the work-holder, and means for feeding the cutter towards the work-holder.

21. An apparatus of the class described, including a support, a nut adjustable thereon, a rotary work-holder mounted upon and adjustable with the nut and including radially adjustable work-engaging means, an adjusting wedge cooperating with the radially adjustable work-engaging means, movable longitudinally upon the support and also rotatable thereon, a shaving cutter in cooperative relation with the work, and means for feeding the cutter towards the work.

22. An apparatus of the class described, including a support, a member adjustable longitudinally on the support, a rotary work-holder mounted upon and adjustable with the said member and including radially adjustable work-engaging means, an adjusting cone cooperating with the radially adjustable work-engaging means, a nut adjustable longitudinally on the support and carrying the cone, said cone being rotatably mounted on the nut, a shaving cutter in cooperative relation with the work-holder, and means for feeding the cutter towards the work-holder.

23. An apparatus of the class described, including a support, a nut adjustable longitudinally on the support, a work-holder rotatably mounted upon the nut and including radially adjustable work-engaging means, a tubular cone embracing the support in cooperative relation with the radially adjustable work-engaging means, a second nut adjustable upon the support and provided with a hand-wheel for adjustably rotating the nut, the cone being carried by the nut and rotatably mounted thereon, a shaving cutter in cooperative relation with the work-holder, and means for feeding the cutter towards the work-holder.

24. An apparatus of the class described, including a standard, a work-holder rotatably mounted upon the standard, a work-driving member rotatable about the standard as an axis and supported independently of the standard, a driving element rotatably mounted upon the standard and connected with the work-driving member for rotating the same, a shaving cutter in cooperative relation with the work-holder, and means for feeding the cutter towards the work-holder.

25. An apparatus of the class described (including a standard, a driving member rotatable upon the standard, an annular support around the standard and independent thereof, a hanger for the driving member, said hanger being rotatably mounted on the annular support, a rotatable work-driving member carried by the hanger, a work-holder rotatable upon the standard, a shaving cutter, and means for feeding the cutter towards the work-holder.

26. In an apparatus of the class described, the combination of a standard, a driving member rotatable upon the standard, an annular support surrounding the standard and independent thereof, a hanger carrying the driving member and rotatably mounted on the support, a work-driving ring disposed above and carried by the hanger, a rotatable work-holder mounted upon the standard and adjustable longitudinally thereon, a shaving cutter in cooperative relation with the work-holder, and means for feeding the cutter towards the work-holder.

27. In an apparatus of the class described, the combination of a standard, a driving member rotatable upon the standard, a work-driving member concentric with the standard and driven by the driving member, a rotatable work-holder mounted upon the standard, a fluid-pressure reservoir mounted above the work-holder and a shaving cutter in cooperative relation with the work-holder and in communication with the fluid pressure reservoir for maintaining an elastically yieldable feeding pressure upon the cutter.

28. In an apparatus of the class described, the combination of a standard, a driving member rotatable thereon, a work-driving member concentric with the standard and driven by the driving member, a rotatable work-holder mounted upon the standard, a fluid pressure reservoir above the work-holder, and a circular series of shaving cutters in cooperative relation with the work-holder, each cutter being in communication with the fluid pressure reservoir for maintaining an elastically yieldable feeding pressure upon the cutter.

29. In an apparatus of the class described, the combination of a pit, a standard rising from the bottom of the pit and extending above the top thereof, a driving member rotatable upon the standard and within the pit, an annular support at the mouth of the pit and independent of the standard, a hanger rotatable upon the support and carrying the driving member, arms rising from the rotatable hanger, a work-driving ring carried by the arms, a rotatable work-holder mounted upon the standard, and a shaving cutter in cooperative relation with the work-holder.

30. In an apparatus of the class described, the combination of a standard, a driving member rotatable upon the lower portion of the standard, a rotatable work-holder mounted upon the upper portion of the standard and driven from the driving member, the driving member constituting a counterbalance for the work-holder, and a shaving cutter in cooperative relation with the work-holder.

31. In an apparatus of the class described, the combination of a standard, a driving member rotatable upon the lower portion of the standard, an annular support surrounding the standard, a hanger rotatable upon the support and carrying the driving member, a work-driving member above and carried by the hanger, a rotatable work-holder mounted upon an upper portion of the standard, the driving member and the work-holder being proportioned to counerbalance one another, and a shaving cutter in cooperative relation with the work holder.

In witness whereof, I hereunto subscribe my name this 6th day of February, 1929.

RUDOLPH I. SCHONITZER.